J. R. WELCH.
METAL WHEEL SPOKE.
APPLICATION FILED NOV. 5, 1921.

1,438,882.

Patented Dec. 12, 1922.
3 SHEETS—SHEET 1.

INVENTOR:
John R. Welch,
BY E. T. Silvius,
ATTORNEY.

J. R. WELCH.
METAL WHEEL SPOKE.
APPLICATION FILED NOV. 5, 1921.
1,438,882.
Patented Dec. 12, 1922.
3 SHEETS—SHEET 2.
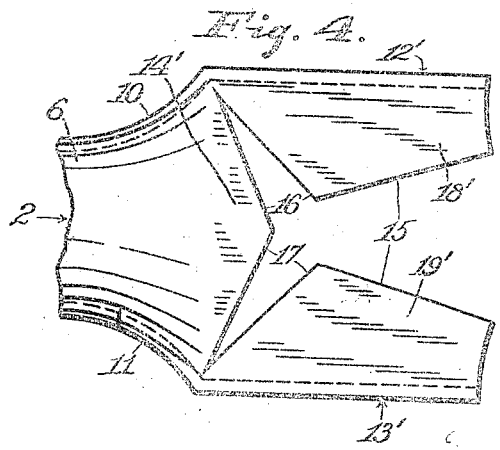
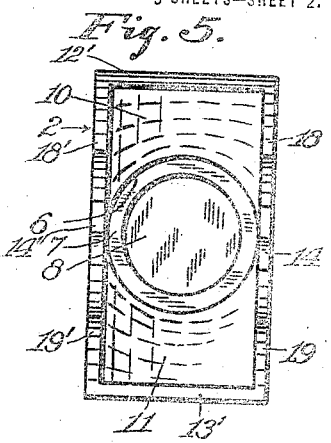
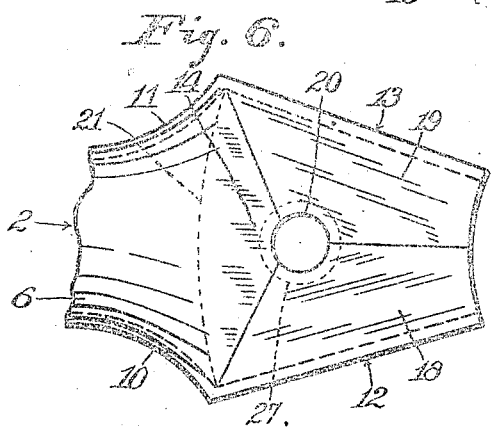
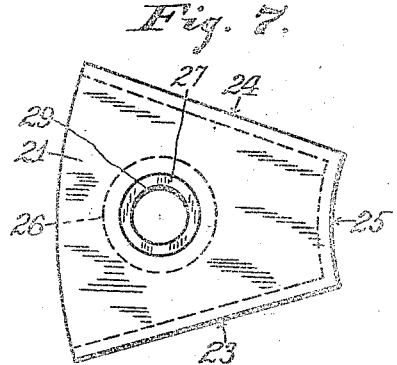
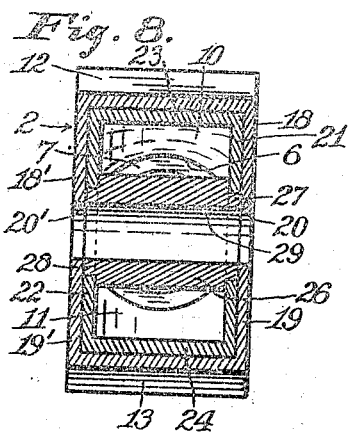
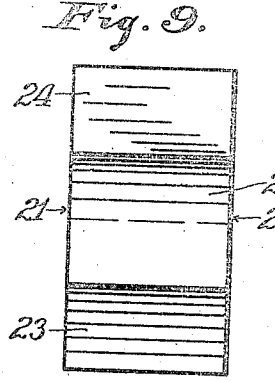
INVENTOR:
John R. Welch,
BY E. T. Silvius
ATTORNEY.

J. R. WELCH.
METAL WHEEL SPOKE.
APPLICATION FILED NOV. 5, 1921.
1,438,882
Patented Dec. 12, 1922
3 SHEETS—SHEET 3.
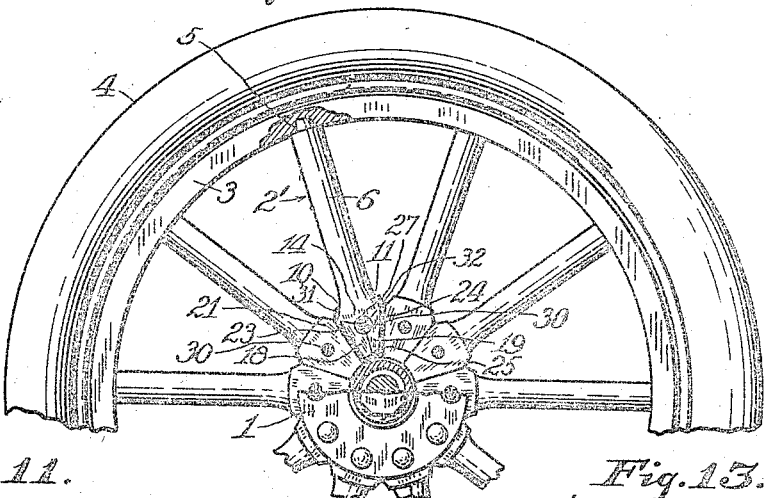
INVENTOR:
John R. Welch,
BY
E. D. Silvius,
ATTORNEY.

Patented Dec. 12, 1922.

1,438,882

UNITED STATES PATENT OFFICE.

JOHN R. WELCH, OF MUNCIE, INDIANA.

METAL WHEEL SPOKE.

Application filed November 5, 1921. Serial No. 513,102.

*To all whom it may concern:*

Be it known that I, JOHN R. WELCH, a citizen of the United States, residing at Muncie, in the county of Delaware and State of Indiana, have invented a new and useful Metal Wheel Spoke, of which the following is a specification, reference being had to the accompanying drawings, and to the letters and figures of reference marked thereon.

This invention relates to vehicle wheels and in particular to hollow metallic wheel spokes.

An object of the invention is to provide an improved metal wheel spoke that shall be so constructed as to be of light weight and yet strong, and which shall not be costly to produce.

Another object is to provide a hollow metal wheel spoke which shall have the appearance of a wooden spoke and be adapted to be used in wheels instead of the other spokes commonly used, but which are becoming costly on account of increasing scarcity of suitable wood of which to make them.

A further object is to provide a strong and durable metal wheel spoke that will not be liable to be destructively damaged, which may be readily replaced by a new spoke when necessitated by serious damage to a wheel, and which shall be economical in use.

With the above-mentioned and other objects in view, the invention consists in a hollow metal wheel spoke of novel construction and having a novel laminated sector portion to be secured to a wheel hub; and, the invention consists also further in the novel parts and features of construction and in the combinations and arrangements of parts, as hereinafter particularly described and further defined in the accompanying claims.

Figure 1:
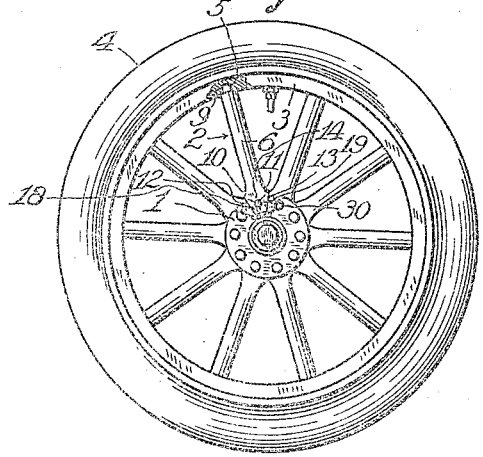
Figure 2:
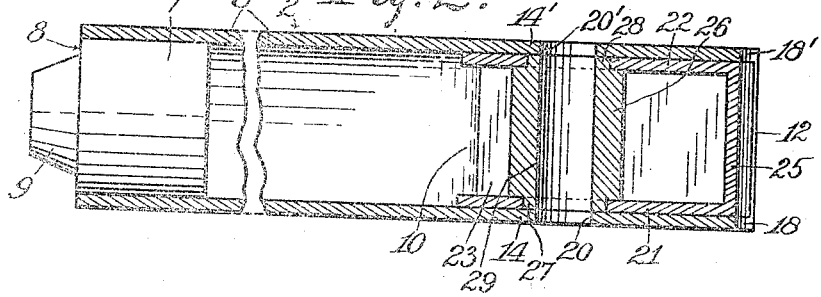
Figure 3:
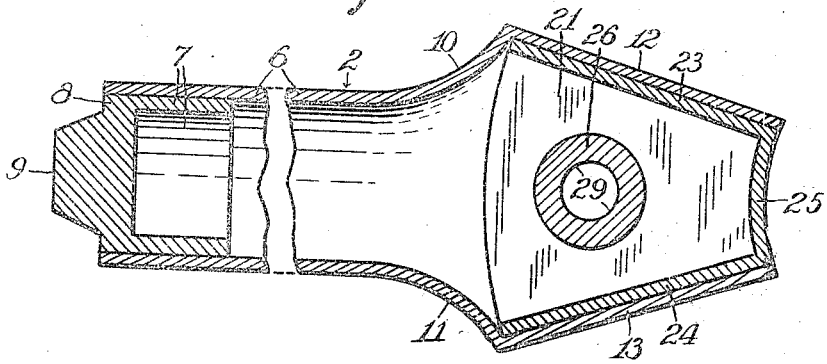

Referring to the drawings, Figure 1 is a front view of a vehicle wheel provided with the improved metal spokes; Fig. 2 is a longitudinal central section of one of the improved spokes, partially broken away; Fig. 3 is a longitudinal central section of the spoke at right angles to the section in the preceding figure, being partially broken away; Fig. 4 is a side view of the sector portion of the spoke as it appears at one stage of construction thereof; Fig. 5 is an end view of the partially made spoke; Fig. 6 is a fragmentary side view of the completed spoke showing the opposite side to that seen in Fig. 4; Fig. 7 is a side view of the reinforcing laminating part of the spoke substantially as constructed and suitable to be applied to the spoke; Fig. 8 is a transverse section of the completed spoke taken through the bolt hole in the sector portion of the spoke; Fig. 9 is an end view of the laminating part of the spoke; Fig. 10 is a fragmentary front view of a vehicle wheel provided with the improved spoke slightly modified, portions being broken away; Fig. 11 is a side view of the sector portion of the spoke partially completed, the opposite side to that seen in Fig. 4 being shown; Fig. 12 is an end view of the sector portion of the spoke minus the laminating part thereof, which in some cases may be omitted; Fig. 13 is a sectional elevation of the complete sector portion of the spoke slightly modified; Fig. 14 is a side view of a slightly modified laminating part of the spoke; Fig. 15 is an end view of the complete spoke partially broken away; and, Fig. 16 is a perspective view of a reinforcing element with which the improved spoke preferably is provided.

Similar reference characters in the different figures of the drawings indicate corresponding or like elements or features of construction herein referred to in detail.

As an illustration of the purpose of the spoke and a practical application thereof a motor vehicle wheel is shown which comprises a suitable hub 1, the improved spokes 2 or 2' as slightly modified, a felly 3 and a suitable tire 4, the felly having sockets 5 to receive the outer end portions of the spokes.

Each spoke comprises a drawn tubular body portion 6 in one end of which is secured a hollow cylinder 7 having a head 8 provided on its outer side with a tapered projection or dowel 9 that is inserted in a socket 5 in the felly, the head 8 and the adjacent end of the spoke being seated against the inner side of the felly. The opposite end of the body portion has flared portions 10 and 11, which preferably are on two opposite portions to constitute a relatively broad sector portion, two flat plates 12 and 13 extending from the ends of the flared portions and convergently each to the other when the spoke is completed. When the sector portion is in process of formation side plates 12' and 13' extend in approximately parallel relation one to the other, as appearing in Figs. 4 and 11, the incomplete sector portion being rectangular in cross-section and preferably oblong, the wall plates thereof being integral with the body portion of the spoke and suitably drawn and pressed to the required sectional shape. Each of the two side plates that are to become the front and rear sides of the spoke are suitably cut away so as to leave gaps in the middle portions and projections 14 and 14' that are flat and extend from the body portion of the spoke. Preferably the gap is formed by cutting away the metal so as to leave a V-shaped opening 15 and relatively smaller V-shaped openings 16 and 17 extending therefrom towards the ends of the flared portions 10 and 11 respectively, thus leaving plate sections 18 and 19 to form the major portion of the front sector plate and similar sections 18' and 19' to constitute the major portions of the rear side sector plate. The metal is bent at the junction of the plates 12' and 13' with the flared spoke portion and forced each towards the other until the inner edges of the plate sections are brought together and portions thereof brought to the edges of the portions 14 and 14', the edges preferably being welded together so as to practically constitute unitary plates which have bolt holes 20 and 20' therein respectively.

The sector portion of the spoke is suitably laminated as may be desired, the laminating part comprising two flat front and rear plates 21 and 22 and side plates 23 and 24 corresponding in angularity to the plates 12 and 13 respectively, and an end or bottom plate 25, all composed of a single piece of metal. In some cases the laminating part is placed in the sector portion and secured therein, and preferably it has a supporting brace 26 therein which has projections 27 and 28 on its opposite ends that extend into suitable openings in the plates 21 and 22 respectively, and the brace has a bore 29 registering with the holes 20 and 20' to receive securing bolts 30 whereby the sector portion of the spoke is secured to the hub.

In some cases it may be desirable to have the laminating part on the outer side of the sector portion of the spoke, and in such cases the relatively angular side plates 23 and 24 preferably have extensions 31 and 32 which are drawn in against the flared portions 10 and 11 respectively, and the broader portions of the front and rear side plates have each relatively narrow extensions 33 that extend upward over the flat portions 14 and 14' and have portions thereof drawn around on the flared portions. In case the brace 26 is desired it is placed between the front and rear sides of the sector portion and the projections 27 and 28 are arranged in suitable openings in the plates, the front and rear plates of the laminating part each having the bolt hole 20 therein registering with the bore 29 in the brace.

It should be understood that the sections 18 and 19 and the portion 14 may vary in contour as may be desired, portions of the plate of which they are formed being cut away accordingly.

In practical use, the spokes safely carry a load imposed upon them, and being seamless between the hub and the felly the slight elasticity of the metal is uniform throughout, and, therefore, slight vibrations resulting from operation of the wheel on roads are uniformly distributed with little or no tendency of the metal of the spoke to become crystallized and fractured. The spokes being tightly assembled in the wheel hub, they cannot become loose and noisy in motion.

Having thus described the invention, what is claimed as new is:—

1. A metal wheel spoke including a hollow seamless body portion and a hollow laminated sector portion, and a brace in the sector portion of the spoke secured to two opposite sides thereof.

2. A metal wheel spoke including a hollow seamless body portion and a sector portion composed of drawn metal, two opposite sides of the sector portion being flat and each composed of a plurality of sections joined together.

3. A metal wheel spoke including a hollow seamless body portion and a sector portion composed of one piece of drawn metal, and a laminating part composed of a separate piece of drawn metal and secured to the sector portion of the spoke.

4. A metal wheel spoke having a hollow seamless body portion, and a sector portion comprising two opposite sides composed of sections joined together and two other sides that are relatively convergent from the body portion, all the sides being integral with the body portion.

5. A metal wheel spoke including a hollow seamless body portion and a hollow laminated sector portion, two opposite sides of the sector portion having each a bolt-hole therein, and a brace in the sector portion of the spoke and secured to the two opposite sides thereof, the brace having a bore extending therethrough and to the bolt holes.

6. A metal wheel spoke having a sector portion comprising two relatively angular plates and front and rear sides having separate sections integral with and extending from the angular plates and joined together, and a hollow seamless body portion integral with the angular plates and having flat front and rear portions joined to the sections of the front and rear sides respectively of the sector portion.

7. A metal wheel spoke having a hollow seamless body portion, one end of the body portion being provided with a solid dowel, the opposite end of the body portion having two opposite flared portions and two flat front and rear portions, and a laminated sector portion comprising two side plates extending convergently each to the other from the flared portions respectively and front and rear plates composed of sections integral with the side plates and extending therefrom each to the other and to the flat front and rear portions respectively, and a laminating part composed of a single piece having relatively angular plates secured to the convergent side plates, front and rear plates secured to the sections of the front and rear plates respectively, and a bottom integral with the angular plates and the front and rear plates of the laminating part.

8. In a metal wheel spoke, the combination of a hollow body portion and a hollow laminated sector portion on the body portion, the sector portion having two opposite sector portions provided each with an aperture, and a brace within the sector portion and having two projections thereon and extending into the apertures respectively, the brace having a bore extending therethrough.

9. In a metal wheel spoke, the combination with a hollow body portion and a hollow sector portion thereon, the sector portion being composed of four side plates, of a laminating part comprising four seamless side plates and a seamless bottom plate, all the plates being integrally connected together and the side plates secured to the side plates of said sector portion.

10. In a metal wheel spoke, the combination of a hollow seamless body portion and a hollow sector portion on one end of the body portion, the sector portion having two opposite plane sector plates composed each of a plurality of sections joined together and a portion extending from said body portion to which the sections are also joined, a laminating part having plane sector plates secured to the sector plates of the sector portion and having a bottom end plate closing the end of the hollow sector portion, and a dowel secured to the opposite end of said body portion.

In testimony whereof, I affix my signature in presence of two witnesses.

JOHN R. WELCH.

Witnesses:
 FRANK B. BERNARD,
 B. F. SHROYER.